US005711837A

United States Patent [19]

Kantrowitz

[11] Patent Number: 5,711,837

[45] Date of Patent: Jan. 27, 1998

[54] DEVICE AND METHOD FOR APPLYING AN IMAGE TO A CERAMIC MUG

[76] Inventor: Jack Kantrowitz, 7430 SW. 131st St., Miami, Fla. 33156

[21] Appl. No.: 585,949

[22] Filed: Jan. 16, 1996

[51] Int. Cl.$^6$ .......... B32B 35/00

[52] U.S. Cl. .......... 156/215; 156/240; 156/272.2; 156/277

[58] Field of Search .......... 156/215, 230, 156/240, 272.2, 277, 379.6, 379.8, 379.9, 384, 387, 481, 492, 499, 583.1, 583.3

[56] References Cited

U.S. PATENT DOCUMENTS

| | | | |
|---|---|---|---|
| 3,816,221 | 6/1974 | Shankm, Jr. | 156/492 |
| 4,066,802 | 1/1978 | Clemens | 427/24 |
| 4,874,454 | 10/1989 | Talalay et al. | 156/359 |
| 5,019,193 | 5/1991 | Aramini | 156/64 |
| 5,170,704 | 12/1992 | Warren et al. | 101/41 |
| 5,244,529 | 9/1993 | Siegel | 156/384 |
| 5,296,081 | 3/1994 | Morin et al. | 156/498 |
| 5,382,313 | 1/1995 | Eminger | 156/583.1 |
| 5,395,478 | 3/1995 | Sattler et al. | 156/481 |
| 5,584,961 | 12/1996 | Ellsworth et al. | 156/481 |

*Primary Examiner*—James Sells
*Attorney, Agent, or Firm*—Allen, Dyer, Doppelt, Milbrath & Gilchrist, P.A.

[57] ABSTRACT

A device for curing a toner image that has been previously transferred to the exterior of a substantially cylindrical ceramic object has a heater dimensioned to be insertable into the object's interior. The heater should be capable of emitting sufficient heat that the heat transferred from the interior to the exterior of the object causes the toner image to adhere to the object and thus be cured. In use the object is supported in surrounding relation to the heating means and within a wall affixed to a base.

2 Claims, 2 Drawing Sheets

DEVICE AND METHOD FOR APPLYING AN IMAGE TO A CERAMIC MUG

BACKGROUND OF THE INVENTION

1. Field of the Invention

The present invention relates to a method and apparatus for transferring an image to a ceramic substrate and, more particularly, to the use of a paper-based transfer sheet and curing device for imprinting an image on a ceramic substrate.

2. Description of Related Art

Transfer sheets have been used for many years to transfer an image to a fabric such as a tee shirt. These sheets typically comprise a base paper coated with a heat-transferrable carrier coating that has characteristics for taking up images formed by dyes, paints, markers, or crayons. In use these images, once imprinted on the coating sheet, are transferred to the desired substrate with the use of heat and pressure, such as with an iron, the coating and the image both being transferred from the base paper to the substrate.

It is also known to create an image generated electronically, for example, by a computer or video camera, for printing onto a transfer sheet (Hare, U.S. Pat. No. 4,773,953) via a color or black-and-white printer.

One problem with these previously used transfer sheets is that the carrier coating is transferred along with the image to the substrate, the integrity of the image thereby dependent upon the adhesion of the carrier coating to the substrate and the appearance often being marred by the presence of visible regions of coating outside the image area.

In order to transfer an image to a ceramic substrate, methods such as gaseous die sublimation and screen printing have been used. The former is very time intensive; the latter is a very labor-intensive process that requires four passes to complete and can utilize hazardous chemicals.

Curing a ceramic object has been accomplished in the past in an open oven with either convective or infrared heat. With this method, however, the heating occurred isotropically. The image was found to turn yellow and even "boil" if heated too long and would not adhere properly if heated for too brief a time.

SUMMARY OF THE INVENTION

It is therefore an object of the present invention to provide a device and method of using same that permits the transfer and curing of an image on a ceramic vessel or any substantially cylindrical object without dissociating the carrier coating from the base paper.

It is a further object to provide such a device and method that produces an image on such a ceramic object having improved durability characteristics.

It is another object to provide such a device and method that impart a glossy finish to the imprinted ceramic object.

It is an additional object to provide a method of transferring an image to and curing the image on a ceramic substrate that is safer, quicker, and cleaner than previously used methods.

The device of the present invention is for use in curing, and in imparting a glossy finish to, a toner image that has been previously transferred to the exterior of a substantially cylindrical ceramic object, such as a cup or mug. Preferably the toner image will not have set fully prior to subjecting the object to the device.

The curing device comprises a means for heating that is dimensioned to be insertable into the object's interior. The heating means should be capable of emitting sufficient heat that the heat transferred from the interior to the exterior of the object causes the toner image to adhere to the object. It is believed, although this theory is not intended to be limiting, that this enhanced durability of the image is conferred by the heat radiating from the inside "drawing" the toner into the ceramic structure and thereby rendering the image an integral part of the object.

The device further comprises a means for supporting the object in surrounding relation to the heating means. In a particular embodiment, for instance, an open end of a vessel is placed over the heater so that the vessel is upside down during the curing operation.

The method of the present invention for curing an image such as described above comprises the steps of supporting the object so that it surrounds a heating element and heating the object's interior. The heating should proceed to a sufficiently high temperature that heat transferred from the interior to the exterior of the object causes the toner image to adhere to the object.

The features that characterize the invention, both as to organization and method of operation, together with further objects and advantages thereof, will be better understood from the following description used in conjunction with the accompanying drawing. It is to be expressly understood that the drawing is for the purpose of illustration and description and is not intended as a definition of the limits of the invention. These and other objects attained, and advantages offered, by the present invention will become more fully apparent as the description that now follows is read in conjunction with the accompanying drawing.

DETAILED DESCRIPTION OF THE PREFERRED EMBODIMENTS

Figure 1:
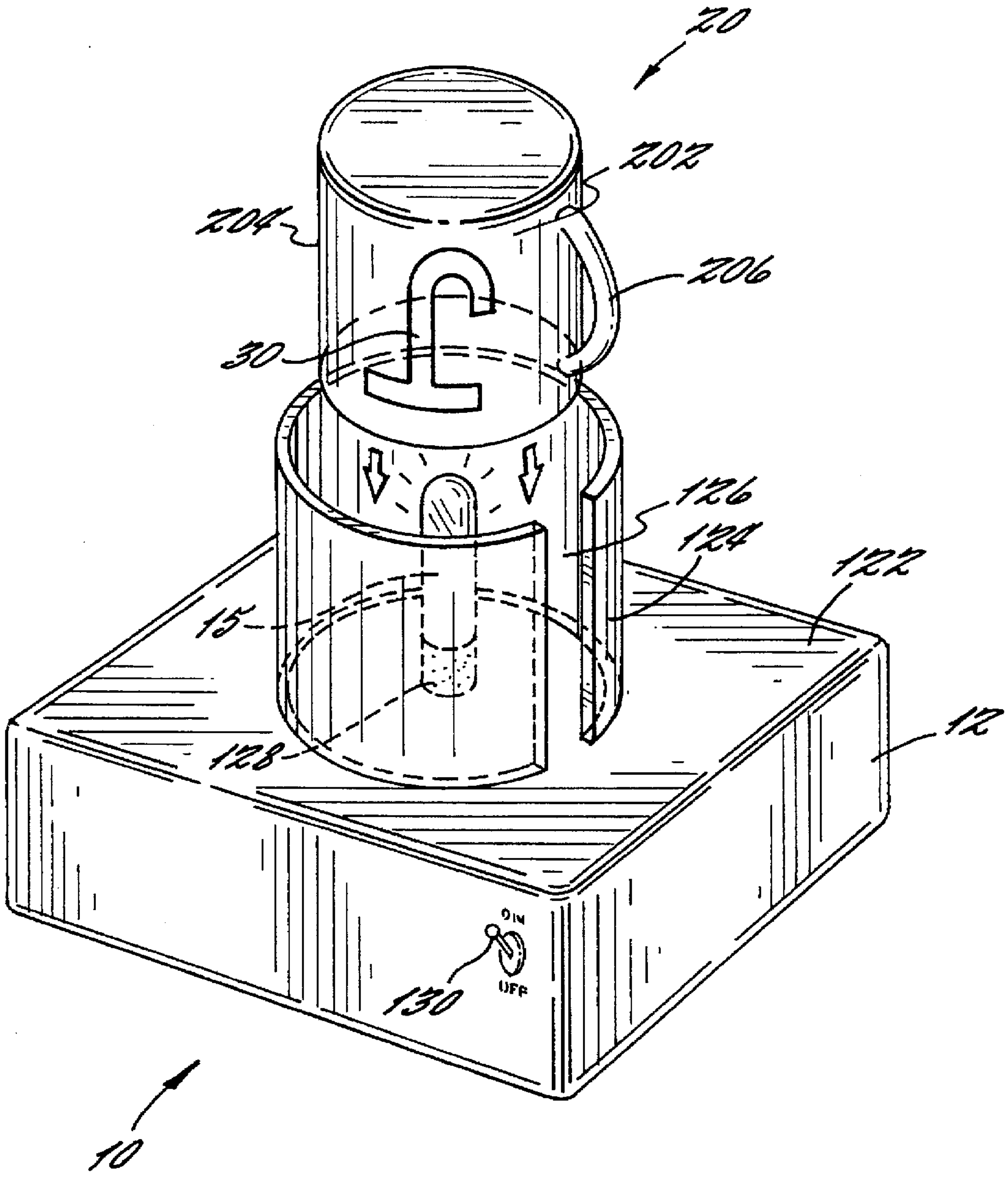
FIG. 1 is a perspective view of the curing device of the present invention.
Figure 2:
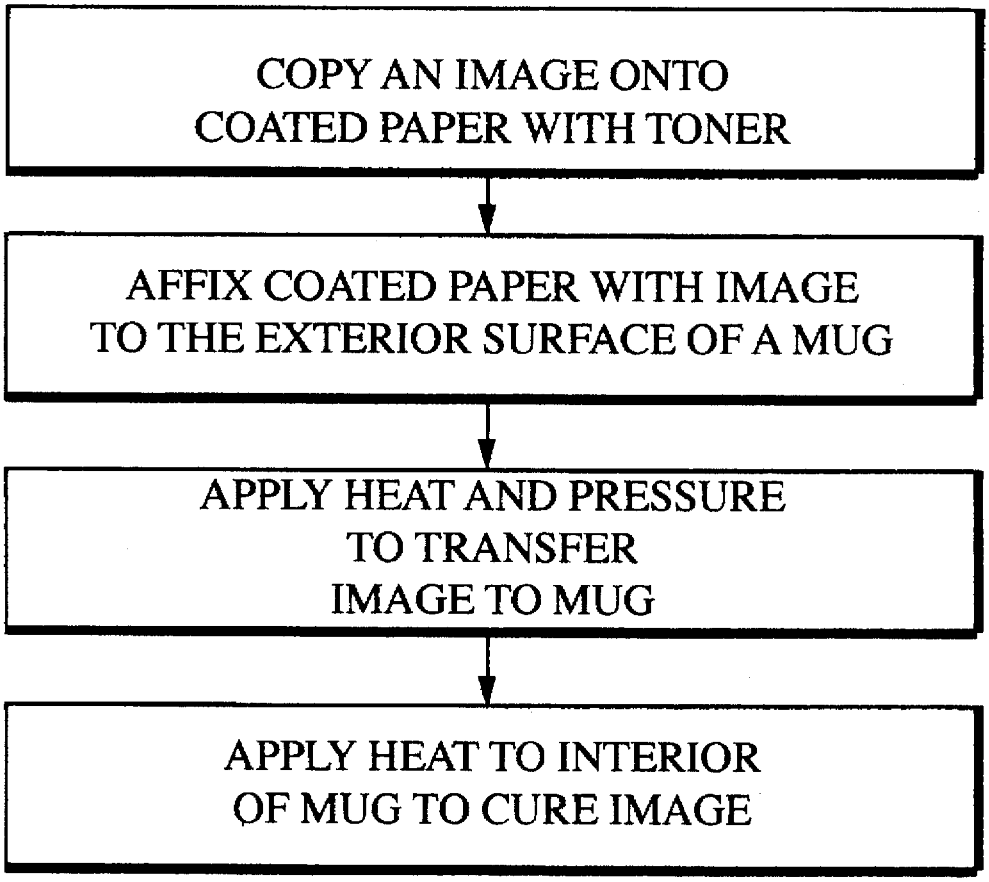
FIG. 2 is a flow chart for the curing and glazing method of the present invention.

A description of the preferred embodiments of the present invention will now be presented with reference to FIGS. 1 and 2.

The preferred embodiment of the curing device 10 shown in FIG. 1 comprises a device for curing a ceramic or porcelain mug 20 or glass, although the device is operable with any generally cylindrical object to which an image is transferrable. The curing device 10 comprises a means for heating that is dimensioned to be insertable into the mug's interior 202. This heating means, which in a preferred embodiment comprises a quartz lamp 15 that has a power in the range of 100–1000 watts, should also be capable of emitting sufficient heat that the heat transferred from the interior 202 to the exterior 204 of the mug 20 causes the toner image 30 to adhere to the mug's exterior 204. Typically this requires a temperature approximately in the range of 100°–450° F., and the device 10 is most effective when the image 30 is in a semiset state.

The device further comprises means for supporting the mug so as to surround the mug 20. As shown in FIG. 1, the support 12 comprises a generally horizontal base 122, affixed to which is a generally cylindrical, upwardly extending wall 124. The wall 124 is positioned to surround the lamp 15 and is dimensioned to have a diameter larger than the mug 20. The wall 124 further has a substantially vertical slot 126 therein, which is dimensioned to permit the mug handle 206 to pass therethrough. In use the mug 20 is placed within the wall 124, with the handle 206 positioned to protrude at least partially from the slot 126.

The quartz lamp 15 is inserted into a socket 128 affixed within the base 122, connected to which is an on-off switch 130 for activating/deactivating the lamp 15.

The method of the present invention for creating a substantially permanent glossy image 30 upon the mug's exterior surface 204 is shown in flowchart form in FIG. 2. The method comprises the steps of providing an image to be copied, which may take the form of a color or black-and-white photograph, and imprinting a copy of the image onto a coated paper with toner. This imprinting may be accomplished, for instance, with the use of a photocopier or laser printer, although these devices are not meant to be limiting.

In a preferred embodiment, the coated paper comprises a sheet of base paper and a carrier coating affixed to a first side of the base paper sheet. The carrier coating comprises a material having physicochemical characteristics for carrying an image imprinted thereon and for releasing the image to a substrate, with an application of heat and pressure, substantially without dissociating from the base paper sheet. This particular form of transfer paper, however, is not meant to be limiting, as images formed by other transfer papers are also curable with the device 10 of the present invention.

The coated paper is then affixed to the mug's exterior 204, so that the carrier coating is against the mug 20 in a location where the toner image is desired to be placed. Sufficient heat and pressure are then applied to dissociate the toner image from the carrier coating and transfer the toner image to the mug 20 but retain the carrier coating on the base paper sheet.

The mug interior 202 is then heated, preferably with the use of the above-described device 10, to a sufficiently high temperature that heat thereby transferred from the interior to the exterior of the object causes the toner image to adhere to the object and further causes a surface of the object to assume a glossy appearance.

It may be appreciated by one skilled in the art that additional embodiments may be contemplated, including the use of the method on other substrates not named above.

In the foregoing description, certain terms have been used for brevity, clarity, and understanding, but no unnecessary limitations are to be implied therefrom beyond the requirements of the prior art, because such words are used for description purposes herein and are intended to be broadly construed. Moreover, the embodiments of the apparatus illustrated and described herein are by way of example, and the scope of the invention is not limited to the exact details of construction.

Having now described the invention, the construction, the operation and use of preferred embodiment thereof, and the advantageous new and useful results obtained thereby, the new and useful constructions, and reasonable mechanical equivalents thereof obvious to those skilled in the art, are set forth in the appended claims.

What is claimed is:

1. A method for creating a substantially permanent glossy image upon an exterior of a substantially cylindrical ceramic object, the method comprising the steps of:

providing an image;

imprinting a copy of the image onto a coated paper with toner, the coated paper comprising:

a sheet of base paper; and a carrier coating affixed to a first side of the base paper sheet, the carrier coating comprising a material having physicochemical characteristics for carrying an image imprinted thereon and for releasing the image to a substrate, with an application of heat and pressure, substantially without dissociating from the base paper sheet;

affixing the coated paper to an exterior of the object, the carrier coating against the object in a location where the image is desired to be placed;

applying sufficient heat and pressure to dissociate the toner image from the carrier coating and transfer the toner image to the object but retain the carrier coating on the base paper sheet; and heating an interior of the object to a sufficiently high temperature that heat thereby transferred from the interior to the exterior of the object causes the toner image to adhere to the object and further causes a surface of the object to assume a glossy appearance.

2. The image-creating method recited in claim 1, wherein the interior heating step comprises heating the object interior with the use of a quartz lamp having a power in the range of approximately 100–1000 watts for a time in the range of 0.5 to 4 minutes.

* * * * *